April 3, 1928.
J. S. GARD
1,664,855
ANTISQUEAK DEVICE FOR VEHICLE BRAKES
Filed April 20, 1926
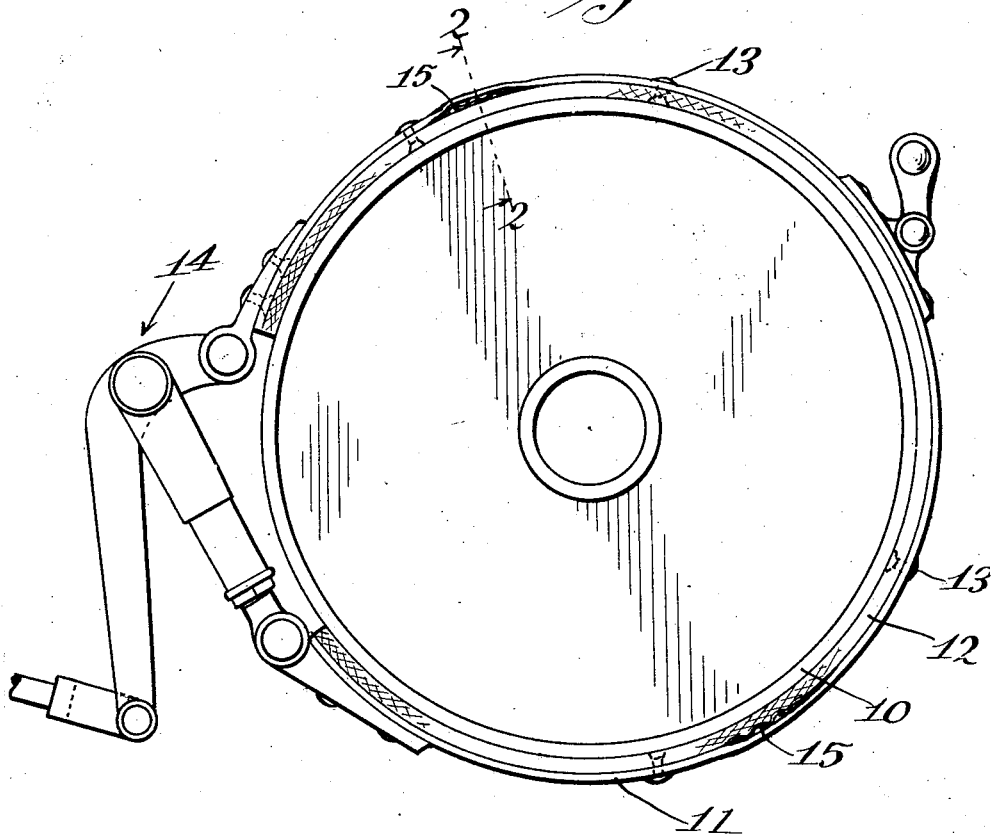
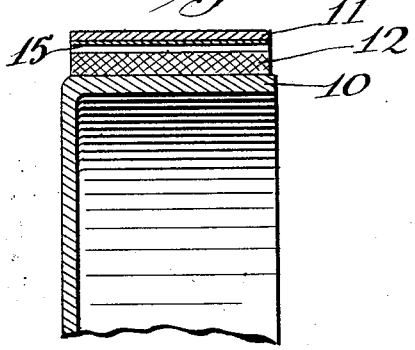
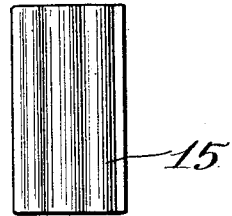
Inventor:
John S. Gard.
by Hazard and Miller
Attorneys.

Patented Apr. 3, 1928.

1,664,855

UNITED STATES PATENT OFFICE.

JOHN S. GARD, OF LOS ANGELES, CALIFORNIA.

ANTISQUEAK DEVICE FOR VEHICLE BRAKES.

Application filed April 20, 1926. Serial No. 103,274.

This invention relates to devices adapted to prevent vehicle brakes from squeaking.

An object of this invention is to provide a cheap, simple and durable construction which can be easily and quickly applied to a vehicle brake and which will be retained in place, and which will satisfactorily stop any squeaking.

With the foregoing and other objects in view which will be made manifest in the following detailed description and specifically pointed out in the appended claim, reference is had to the accompanying drawings for an illustrative embodiment of the invention, wherein:

Figure 1 is a side elevation of a brake of conventional construction illustrating two of the devices in applied position thereon, Fig. 2 is a vertical section taken on the line 2—2 of Fig. 1, Fig. 3 is a plan view of one of the anti-squeak devices, and Fig. 4 is an end elevation of the devices shown in Fig. 3.

Referring to the accompanying drawings wherein similar reference characters designate similar parts throughout, the brake drum is indicated at 10, about which is a brake shoe 11, on the inside of which there is a lining 12. The lining is held in place by the conventional rivets 13, and in the modification shown which is of the external contracting type, the shoe is caused to contract by the lever mechanism indicated generally at 14. The anti-squeak devices adapted to be applied are formed of sheet metal and are indicated at 15. They are preferably formed of a non-corrodible metal, such as brass, and in the preferred form they are rectangular in shape, being in length approximately equal to the width of the lining 12. These strips of sheet metal are corrugated, the corrugations extending longitudinally of the strip. In applying the devices to the brake, the brake is first inspected as to the amount of clearance between the engaging surface of the lining 12 and the drum 10. At the point or points where the clearance is a maximum, the anti-squeak device is inserted between the lining and the brake shoe, the device being of such width that it can be readily inserted between the various rivets 13. It extends transversely across the brake shoe and is frictionally maintained in place by the lining. In this manner the strip 15 acts as a spacing element, spacing the lining from the brake shoe so as to reduce the excess clearance between the lining and the brake drum. It will be found that upon application of these devices to a brake shoe in the above described manner the squeaking will be effectively stopped in a short time.

The strip 15 is corrugated for several purposes. One reason is that it provides a certain amount of spring so that the brake lining can be pressed against it and flatten it slightly on the contraction of the brake shoe on the drum. The most important advantage of having the corrugations is that these corrugations provide for air passages, enabling the air to readily pass along the corrugations on the back of the lining, so that the lining will become effectively cooled to keep it from burning at the points where my devices are applied. If a solid flat spacing element were used, this lack of cooling would cause the lining to quickly burn through at the points of application of the spacing element.

From the above described construction it will be appreciated that the improved anti-squeak device can be very easily, quickly and cheaply manufactured and can be quickly applied.

It will be understood that various changes in the detail of construction may be made without departing from the spirit or scope of the invention as defined by the appended claim.

I claim:

In a brake shoe having a lining secured thereto by rivets, an anti-squeak device comprising a strip of sheet metal which in length is substantially equal to the width of the lining, and which is shorter in width than in length, thereby enabling it to be readily inserted between the shoe and the lining between adjacent rivets, said strip having flat longitudinal edge portions and being corrugated with the corrugations extending lengthwise thereof between the flat edge portions and lying entirely on one side of the plane of the flat edge portions, said device being maintained in position between said brake lining and shoe, solely by its frictional contact with said elements and serving to force portions of the lining into binding engagement with a brake drum.

In testimony whereof I have signed my name to this specification.

JOHN S. GARD.